(12) United States Patent
Lay

(10) Patent No.: US 6,302,132 B1
(45) Date of Patent: Oct. 16, 2001

(54) VALVE ASSEMBLY INCLUDING GEARBOX

(75) Inventor: Mark A. Lay, Sulphur Springs, TX (US)

(73) Assignee: Nordstrom Valves, Inc, Sulphur Springs, TX (US)

(*) Notice: Subject to any disclaimer, the term of this patent is extended or adjusted under 35 U.S.C. 154(b) by 0 days.

(21) Appl. No.: 09/559,283

(22) Filed: Apr. 27, 2000

(51) Int. Cl.$^7$ .............................. F16K 5/00; F16K 27/00
(52) U.S. Cl. .................. 137/15.22; 251/304; 251/315.1; 137/15.18
(58) Field of Search ................... 251/129.11, 304, 251/315.01, 315.1, 315.11, 315.12; 137/15.18, 15.22

(56) References Cited

U.S. PATENT DOCUMENTS

| | | | |
|---|---|---|---|
| 3,480,253 | * 11/1969 | Priese et al. | 251/315.01 X |
| 4,538,789 | 9/1985 | An . | |
| 4,587,990 | * 5/1986 | Pennell et al. | 251/315.01 X |
| 4,848,398 | 7/1989 | Leach . | |
| 4,862,915 | 9/1989 | Renfro . | |
| 5,000,213 | 3/1991 | Tervo et al. . | |
| 5,029,599 | 7/1991 | Ball . | |
| 5,269,339 | 12/1993 | Szatmary . | |
| 5,287,881 | 2/1994 | Szatmary . | |
| 5,624,100 | 4/1997 | Bolte et al. . | |
| 6,206,023 | * 3/2001 | Landers | 137/15.18 |

OTHER PUBLICATIONS

Nordstrom Valves, Inc. Drawing No. B–2758883, Aug. 23, 1996.
Nordstrom Valves, Inc. Drawing No. D–2759721, Oct. 15, 1997.
Nordstrom Valves, Inc. Drawing No. D–2759171, Feb. 24, 1997.
Nordstrom Valves, Inc. Drawing No. E–2759166, Jul. 2, 1997.

* cited by examiner

*Primary Examiner*—Kevin Lee
(74) *Attorney, Agent, or Firm*—Myers Bigel Sibley & Sajovec

(57) ABSTRACT

A valve assembly includes a valve and a gearbox. The valve includes a valve body having a drive opening and a mounting surface adjacent the drive opening. At least one mounting bore is formed in the mounting surface. At least one rigid pin is fixed to and projects from the mounting surface. A rotatable valve member is disposed in the valve body. A gearbox is operable to rotate the valve member through the drive opening. The gearbox includes a casing including a mounting wall positioned adjacent the mounting surface of the valve body. At least one mounting hole is formed in the mounting wall and is disposed adjacent the mounting bore. At least one pin hole is formed in the mounting wall and receives the pin. A drive hole is formed in the mounting wall and communicates with the drive opening. At least one fastener extends through the mounting hole and engages the mounting bore to secure the casing to the mounting surface. The pin resists relative rotational movement of the casing and the valve body.

16 Claims, 10 Drawing Sheets

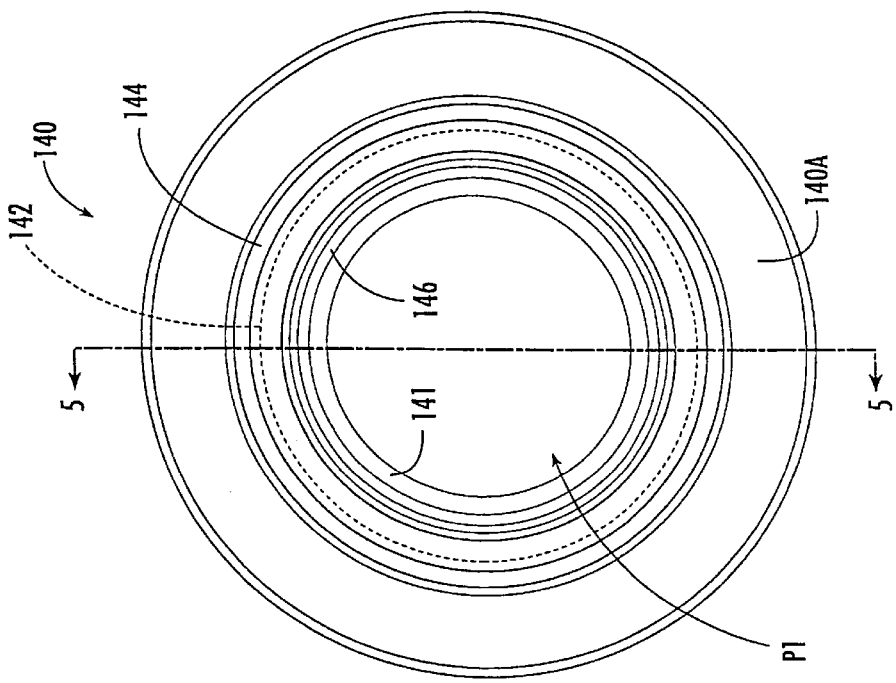
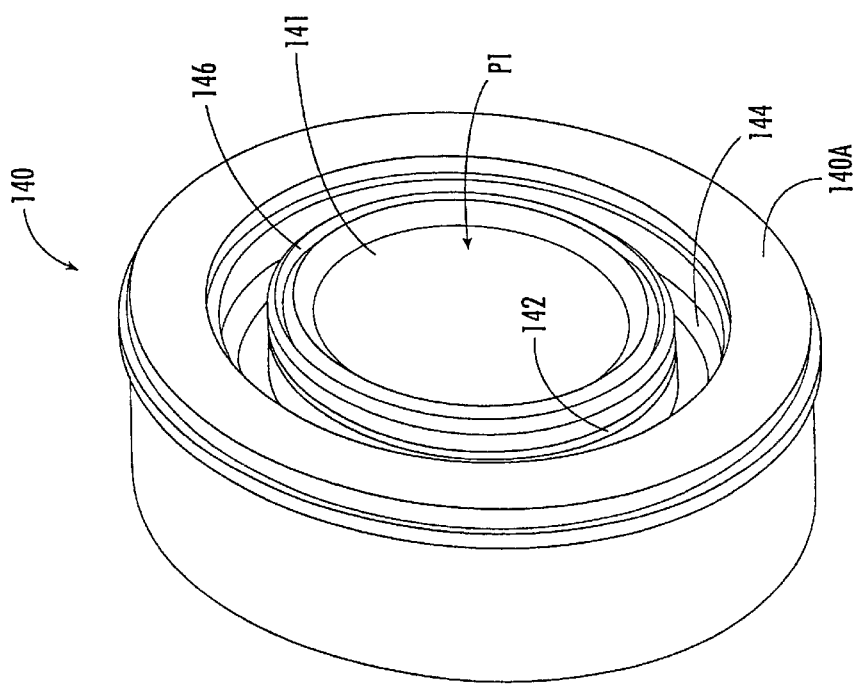
FIG. 4.
FIG. 3.

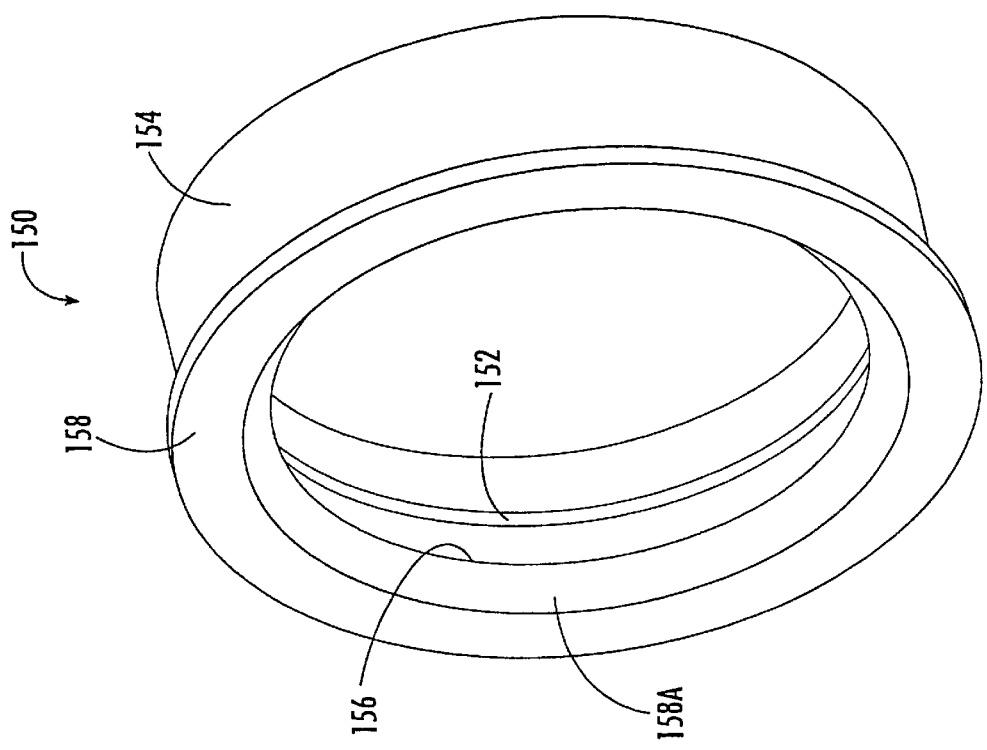
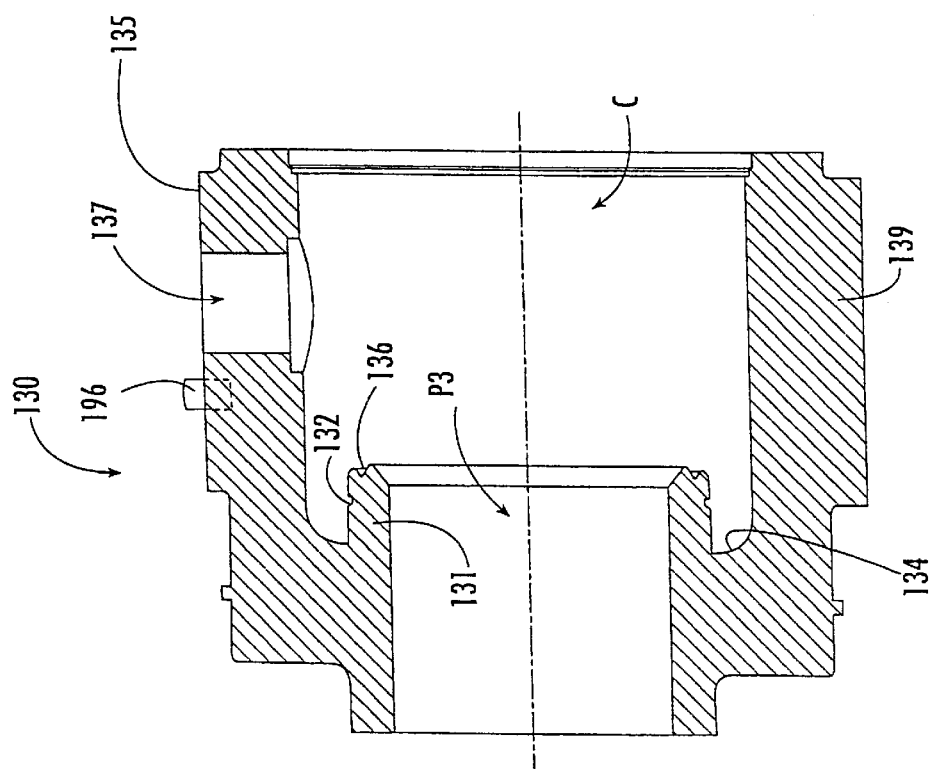

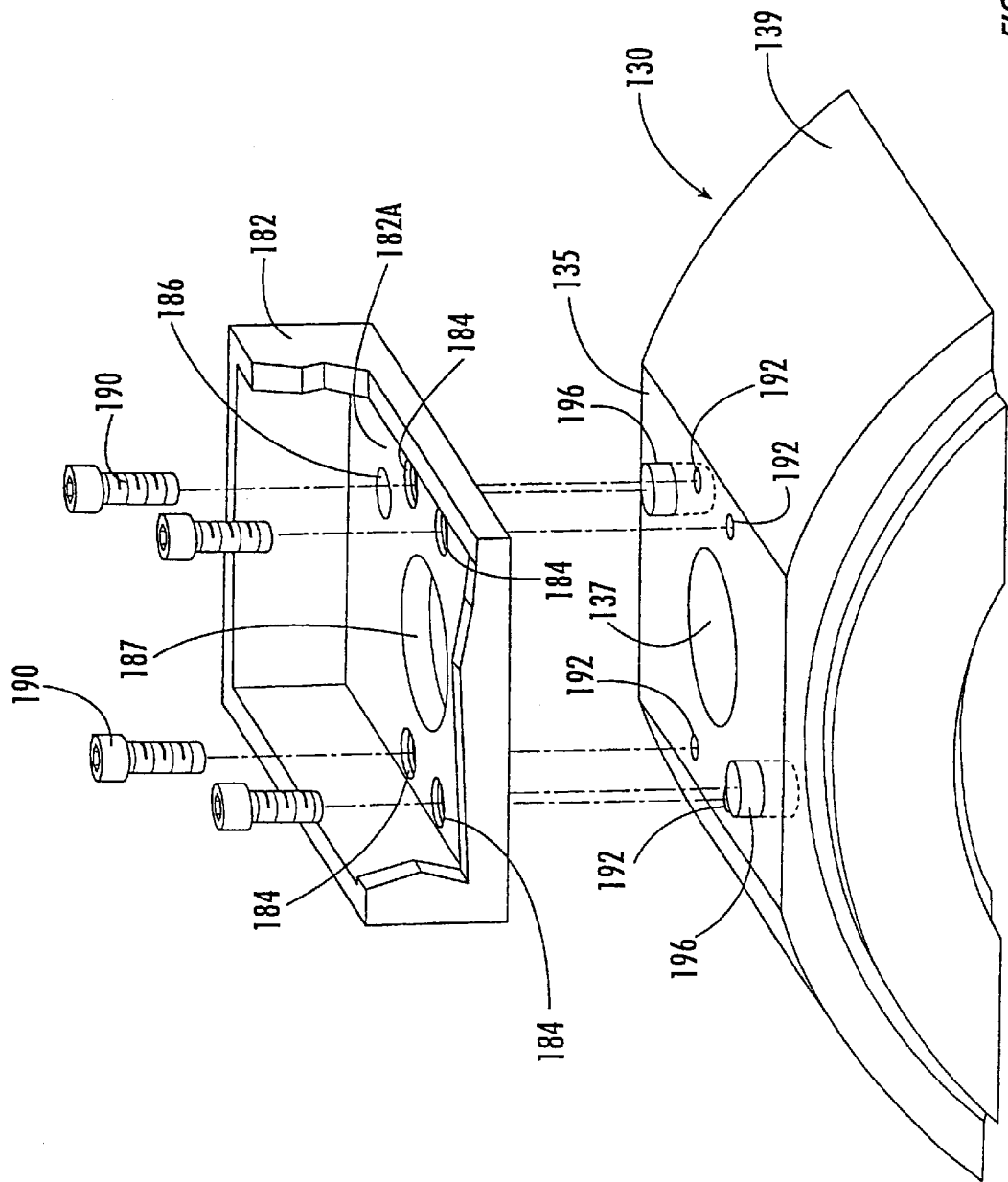

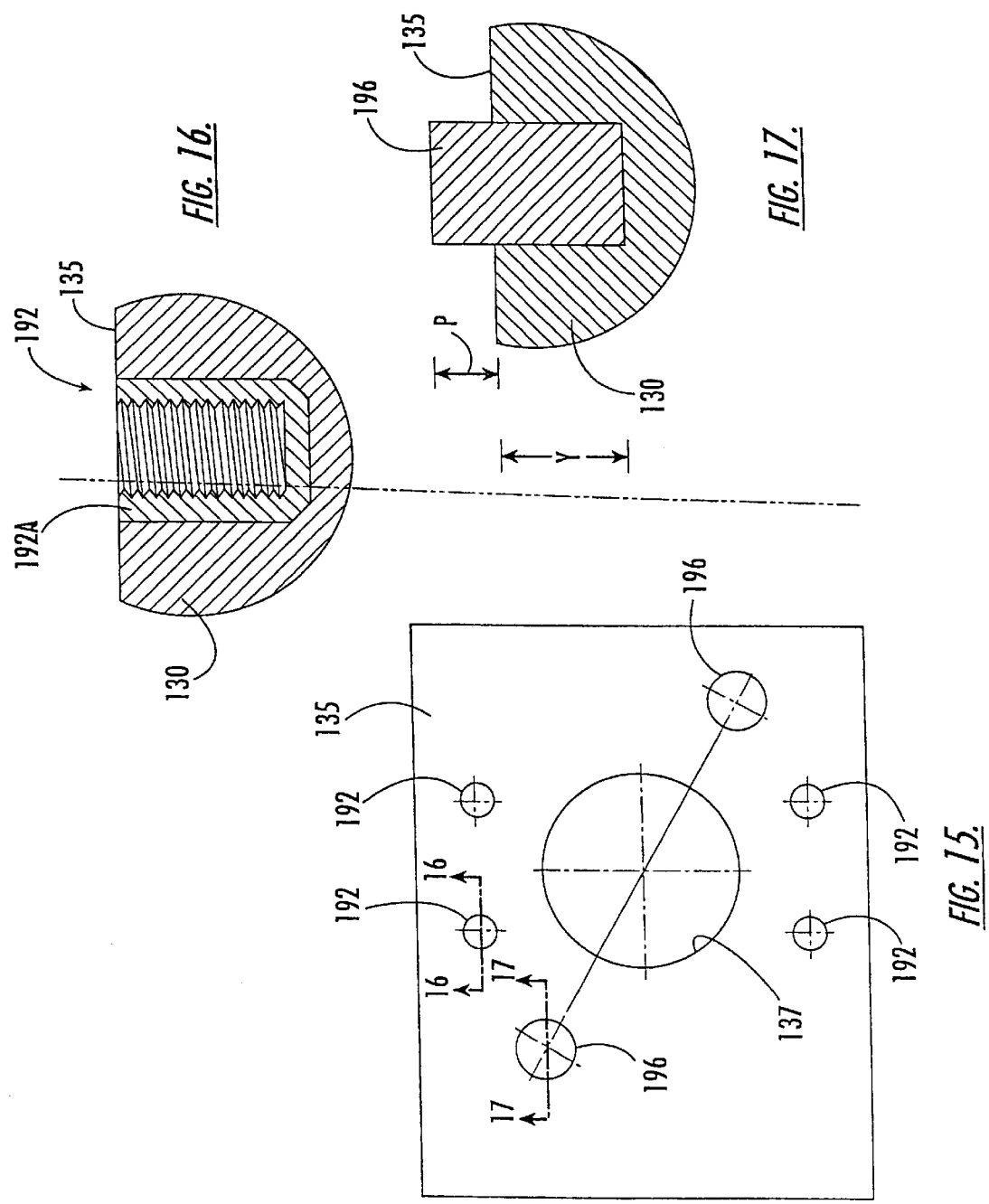

VALVE ASSEMBLY INCLUDING GEARBOX

FIELD OF THE INVENTION

The present invention relates generally to valves and, more particularly, to valves including gearboxes mounted thereon.

BACKGROUND OF THE INVENTION

Polymeric ball valves are widely used for a variety of industrial applications. Polymeric ball valves typically provide the advantages of relatively light weight, low cost, corrosion resistance, and the ability to be welded on site into a piping system.

A known method of forming a polymeric ball valve includes providing a polymeric body/end piece and a polymeric end piece. A valve ball is disposed in the body/end piece and the end piece is fused to the body/end piece to enclose the valve ball in an integral valve body. A pair of resilient, ring-shaped seats provide seals between the ball and the body/end piece and the end piece. Each seat is held in place by a respective ring-shaped seat retainer. An example of a valve of this construction is disclosed in U.S. Pat. No. 5,232,201 to Spears et al.

A preferred method for forming a ball valve of the type described includes inserting a first seat, a first seat retainer and the ball into the body/end piece. Thereafter, a second seat retainer, a second seat and the end piece are placed over the ball and the end piece is fused to the body/end piece.

During the assembly procedure, the seats should be maintained in the desired position to ensure proper mating between the seats and the ball. One method for holding the seat retainer, and thereby the seat, in place includes providing flanges projecting inwardly from the body/end piece and the end piece, outer threads on the flanges and inner threads on the seat retainers. The seat retainers are screwed onto the flanges and thereby held in place. However, the threads must be molded, machined or otherwise formed on the body/end and end pieces. The thread formation may add significantly to the cost and inconvenience of manufacturing the valve. In particular, because the seat retainers and the body/end and end pieces are typically formed of polyethylene or polypropylene, care must be taken in forming the threads. Furthermore, care must be taken in screwing the seat retainers on to avoid cross-threading and damaging the threads. Additionally, a tendency may exist to distort the seat as the seat retainer rotates into engagement with the seat, or to apply too much or too little pressure to the seat by under-tightening or over-tightening the seat retainer.

Polymeric ball valves (and other valves including rotatable valve members) may be provided with a gearbox to facilitate rotation of the ball to open and close the valve. Typically, the gearbox includes a casing, a gear reducer and a drive shaft adapted to engage a valve stem which is connected to the ball. Drive means such as an electric motor may be disposed in or on the casing or otherwise associated with the gearbox.

In order to secure the gearbox to a polymeric ball valve, it is known to provide an integral upstanding flange on the valve body. The flange surrounds the valve stem. Holes are formed radially through the flange. The gearbox may be mounted on the flange by inserting bolts through the holes.

The foregoing gearbox mounting arrangement may suffer from a number of potential drawbacks. The provision of an upstanding flange which is strong enough and secure enough to resist torque from the gearbox without failure may add significantly to the weight and to the cost of forming the valve. Moreover, it may be necessary to provide a special bracket on the gearbox to allow mounting on the flange.

SUMMARY OF THE INVENTION

According to embodiments of the present invention, a valve is adapted to receive a gearbox. The valve includes a valve body having a drive opening and a mounting surface adjacent the drive opening. At least one mounting bore is formed in the mounting surface and is adapted to receive a fastener. At least one rigid pin is fixed to and projects from the mounting surface. A rotatable valve member is disposed in the valve body and is operable through the drive opening.

According to further embodiments of the present invention, a valve assembly includes a valve and a gearbox. The valve includes a valve body having a drive opening and a mounting surface adjacent the drive opening. At least one mounting bore is formed in the mounting surface. At least one rigid pin is fixed to and projects from the mounting surface. A rotatable valve member is disposed in the valve body. The gearbox is operable to rotate the valve member through the drive opening. The gearbox includes a casing including a mounting wall positioned adjacent the mounting surface of the valve body. At least one mounting hole is formed in the mounting wall and is disposed adjacent the mounting bore. At least one pin hole is formed in the mounting wall and receives the pin. A drive hole is formed in the mounting wall and communicates with the drive opening. At least one fastener extends through the mounting hole and engages the mounting bore to secure the casing to the mounting surface. The pin resists relative rotational movement of the casing and the valve body.

According to further embodiments of the present invention, a method for mounting a gearbox on a valve of the type having a valve body and a rotatable valve member disposed in the valve body includes placing the gearbox on a mounting surface of the valve body such that a drive hole formed in a mounting wall of the gearbox communicates with a drive opening in the valve body and such that at least one rigid pin fixed to and projecting from the mounting surface is received in at least one corresponding pin hole in the mounting wall of the gearbox. The method further includes inserting fasteners through at least one mounting hole in the mounting wall such that the fastener engages a bore formed in the valve body to secure the gearbox to the mounting surface.

According to embodiments of the present invention, a method for forming a valve includes providing a body piece including an axially extending annular flange having an outer surface and a first element. The first element comprises at least one of a recess defined in the outer surface of the flange and a projection extending from the outer surface of the flange. A valve seat is placed on the flange. An annular seat retainer is provided. The seat retainer has an inner surface and includes a second element comprising at least one of a recess defined in the inner surface of the retainer and a projection extending from the inner surface of the seat retainer. The seat retainer is slid axially onto the flange until the first and second elements snap fit into engagement and such that the seat is thereby retained in position on the flange.

Preferably, the first element comprises a continuous, endless, circumferential, radially extending groove, the second element comprises a continuous, endless, circumferential, radially extending rib, and the step of axially sliding the seat retainer onto the flange includes snap fitting the rib into engagement with the groove.

According to further embodiments of the present invention, a valve includes a valve body defining a cavity and including a flange having an outer surface and a first element. The first element includes at least one of a recess defined in the outer surface of the flange and a projection extending from the outer surface of the flange. A seat retainer is mounted on the flange and has an inner surface. The seat retainer includes a second element including at least one of a recess defined in the inner surface of the seat retainer and a projection extending from the inner surface of the seat retainer. A valve seat is retained on the flange by the seat retainer. The seat retainer is secured to the flange by a cooperative snap fit engagement between the first and second elements. A valve member may be rotatably mounted in the cavity and engage the valve seat.

Preferably, the first element comprises a continuous, endless, circumferential, radially extending groove, and the second element comprises a continuous, endless, circumferential, radially extending rib. The seat retainer is secured to the flange by a cooperative snap fit engagement between the rib and the groove. Preferably, the groove is defined in the outer surface of the flange and the rib extends radially inwardly from the inner surface of the seat retainer.

The valve body may include first and second body pieces. The body pieces may be fused together. Preferably, the body pieces and the seat retainer are formed of polymeric material.

According to further embodiments of the present invention, a valve assembly includes a valve and a gearbox. The valve includes a valve body having a drive opening and a mounting surface adjacent the drive opening. A rotatable valve member is disposed in the valve body. The gearbox is operable to rotate the valve member through the drive opening. The gearbox includes a casing including a mounting wall positioned adjacent the mounting surface of the valve body. At least one mounting hole is formed in the mounting wall. A drive hole is formed in the mounting wall and communicates with the drive opening. At least one rigid pin is fixed to and projects from one of the mounting surface and the bottom wall and is received in the other of the mounting surface and the bottom wall. At least one fastener extends through the mounting hole to secure the casing to the mounting surface. The pill resists relative rotational movement of the casing and the valve body.

Objects of the present invention will be appreciated by those of ordinary skill in the art from a reading of the Figures and the detailed description of the preferred embodiments which follow, such description being merely illustrative of the present invention.

BRIEF DESCRIPTION of the DRAWINGS

FIG. 3 is a front, perspective view of the second body piece of the valve assembly of FIG. 1;

FIG. 4 is a front elevational view of the second body piece of the valve assembly of FIG. 1;

FIG. 7 is a center cross-sectional view of a first body piece of the valve assembly of FIG. 1;

FIG. 8 is a front, perspective view of the seat retainer of the valve assembly of FIG. 1;

FIG. 13 is an exploded, perspective view of the valve assembly of FIG. 1 showing a gearbox casing and means for mounting the same to the valve assembly;

FIG. 15 is a top, schematic view of the valve assembly of FIG. 1 indicating the relative locations of holes, bores and pins forming a part of the valve assembly;

FIG. 16 is a cross-sectional, fragmentary, enlarged view of the valve assembly of FIG. 1 taken along the line 16—16 of FIG. 15; and FIG. 17 is a cross-sectional, fragmentary, enlarged view of the valve assembly of FIG. 1 taken along the line 17—17 of FIG. 15.

DETAILED DESCRIPTION of the PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
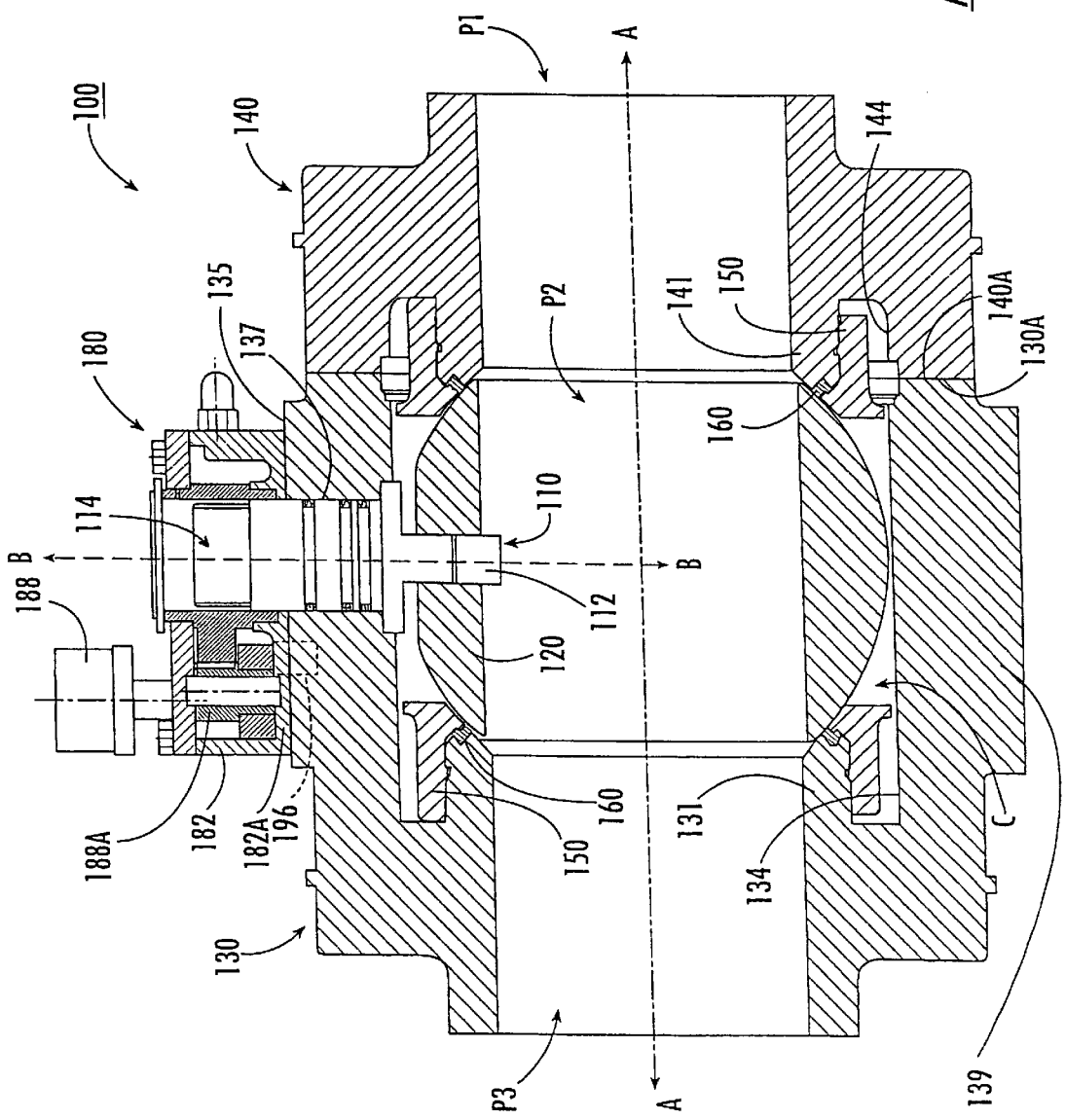
FIG. 1 is a center cross-sectional view of a valve assembly according to the present invention.

With reference to the drawings, a valve assembly according to a preferred embodiment of the present invention is shown therein and generally designated 100. The valve assembly 100 is preferably and illustratively a polymeric ball valve. With reference to FIG. 1, the valve assembly 100 defines a lengthwise axis A—A. As used herein, "radially" refers to those directions perpendicular to and outward from the axis A—A. The valve assembly 100 includes a first body piece 130 (also shown in FIG. 7) and a second body piece 140 (also shown in FIGS. 2–6) joined to the first body piece along respective faces 130A, 140A. The body pieces 130, 140 form opposed end body portions of the valve assembly 100. The body piece 130 also includes a center body portion 139 extending axially toward the second body piece 140.

The center body portion 139 defines a cavity C. A valve ball 120 is disposed in the cavity C. A valve stem 110 extends through a hole 137 in the body piece 130 and includes a tab 112 keyed into a slot in the ball 120 such that the ball 120 may be rotated by turning the stem 110. A first passageway P1 is defined in the second body piece 140, a second passageway P2 is defined in the ball 120 a third passageway P3 is defined in the first body piece 130.

As will be recognized by those of ordinary skill in the art, the valve assembly 100 may be opened by rotating the ball 120 about the axis B—B of the stem 110 such that the passageways P1, P2 and P3 are aligned, and closed by rotating the ball 110 such that the passageway P2 is perpendicular to the passageways P1 and P3 and the flow of media through the valve assembly 100 is blocked by the ball 120. Elastomeric, annular valve seats 160 are positioned between the first and second body pieces 130, 140 and the ball 120. The seats 160 provide a seal between the body pieces 130, 140 and the ball 120 when the valve assembly 100 is closed to prevent or inhibit media from flowing through the passage P1 or the passage P3 and around the ball 120. As discussed in more detail below, the seats 160 are retained and supported by respective associated seat retainers 150 (see FIGS. 8–10) and flanges 131, 141 of the first and second body pieces 130, 140.

Turning to the second body piece 140 in more detail and with reference to FIGS. 1–6, the body piece 140 includes an axially projecting annular flange 141 and a surrounding axially extending groove 144. An endless, annular end groove 146 is defined in the inward end of the flange 141. The end groove 146 has adjoining walls 146A, 146B. An endless, annular, continuous, radially inwardly extending groove 142 is formed in the outer peripheral surface of the flange 141. The groove 142 has a radially extending wall 142B, an axially extending wall 142A and an angled wall 142C. Preferably, the groove 142 is formed such that the axis A—A extends through the center of the circle defined by the groove 142 and such that the axis A—A is orthogonal to a plane defined by the wall 142B of the groove.

The body piece 140 is preferably integrally formed from a suitable polymeric material, more preferably a thermoplastic material. More preferably, the body piece 140 is formed of high density polyethylene, low density polyethylene, or PVC. Most preferably, the body piece 140 is formed of high density polyethylene. The body piece is preferably machined from billet or bar stock, but may be molded. The grooves 142, 144 and 146 are preferably molded into the body piece 140. However, one or more of the grooves 142, 144, 146 may be machined into the body piece 140.

Figure 9:
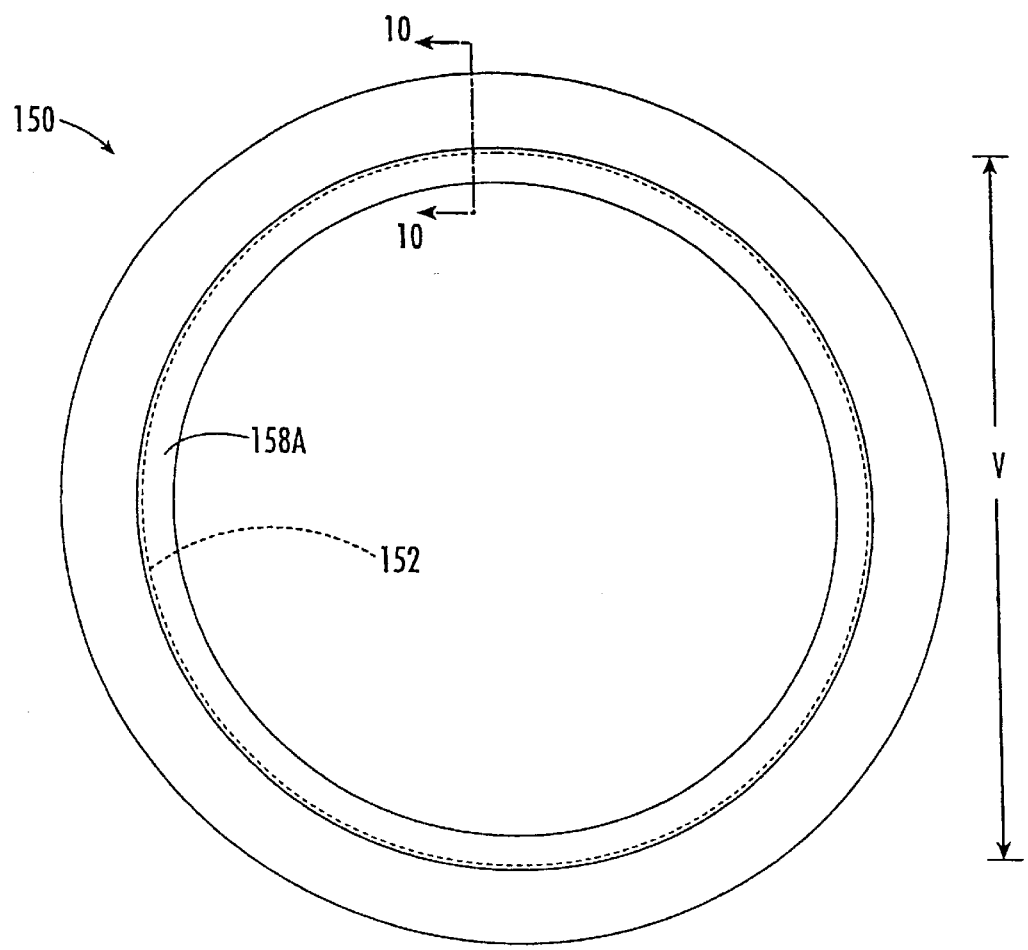
FIG. 9 is a front elevational view of the seat retainer of the valve assembly of FIG. 1.
Figure 10:
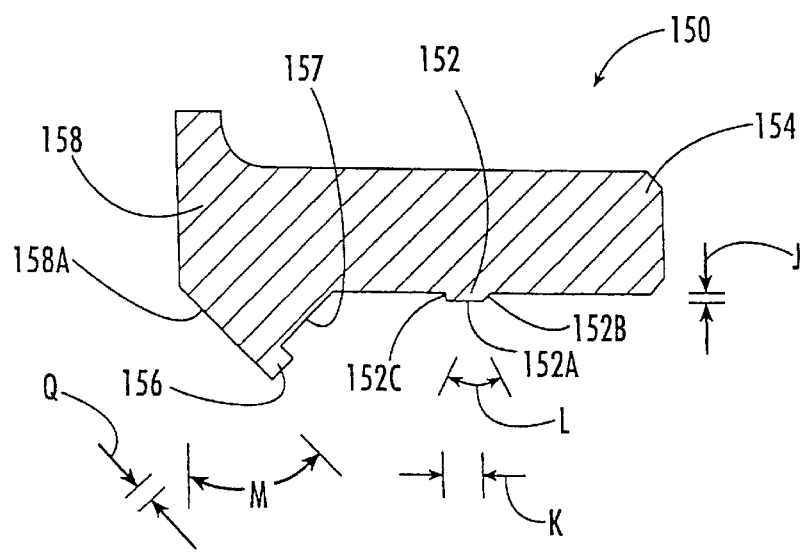
FIG. 10 is a cross-sectional view of the seat retainer of the valve assembly of FIG. 1 taken along the line 10—10 of FIG. 9.

As best seen in FIGS. 8–10, the seat retainer 150 is a circular ring having an annular head 158 and an annular base 154 extending axially from the head. The head 158 has an angled front wall 158A, an angled rear wall 157 and an annular projection or rib 156 extending inwardly. A continuous, annular projection or rib 152 extends radially inwardly from the inner surface of the base 152. The projection 152 is preferably endless as shown. The projection 152 includes a radially extending wall 152C, an axially extending wall 152A and an angled wall 152B. The seat retainer 150 is preferably formed from a resilient material. More preferably, the seat retainer is formed of a material having a modulus of elasticity of between about $29 \times 10^{-6}$ psi and $9.0 \times 10^{-4}$ psi. Preferably, the seat retainer 150 is formed of stainless steel, polyethylene, or polypropylene. Most preferably, the seat retainer 150 is formed of polypropylene. The seat retainer 150 may be formed by molding or fabrication. The inner diameter V (see FIG. 9) of the base 154 of the seat retainer 150 (not including the projection 152; see FIG. 9) is preferably substantially the same or slightly greater than the outer diameter U (see FIG. 5) of the flange 141.

Figure 12:
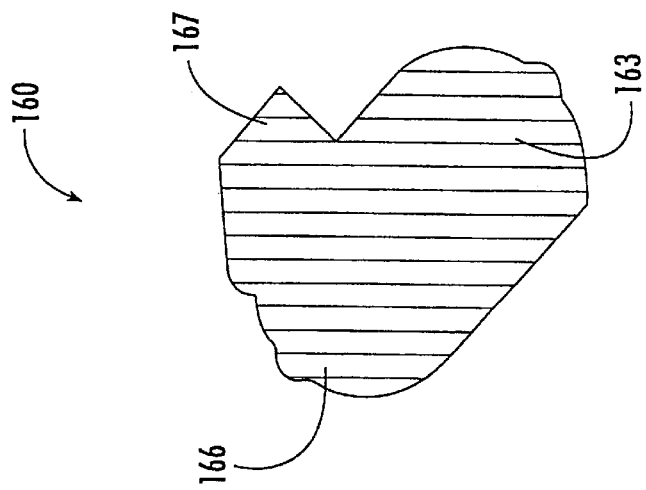
FIG. 12 is a cross-sectional view of the seat of the valve assembly of FIG. 1 taken along the line 12—12 of FIG. 11.
Figure 11:
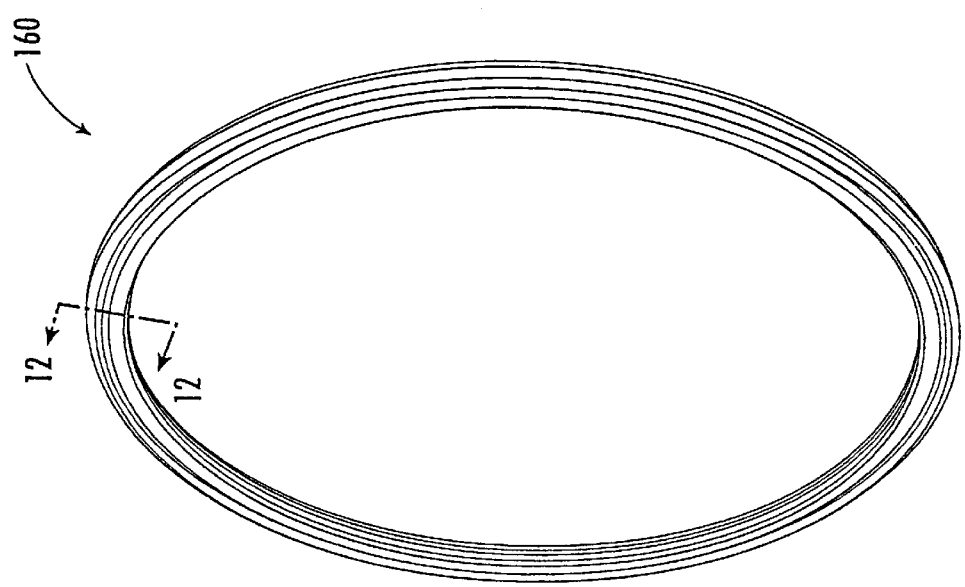
FIG. 11 is a front, perspective view of the seat forming a part of the valve assembly of FIG. 1.

As best seen in FIGS. 11 and 12, the seat 160 forms a circular ring. The seat 160 has an inner, forward lobe or portion 163, an outer, forward portion 167 and a rearward portion 166. Preferably, the seat 160 is formed of rubber. Preferably, the durometer of the seat 160 is between about 50 and 90. The seat 160 may be formed by molding.

Figure 2:
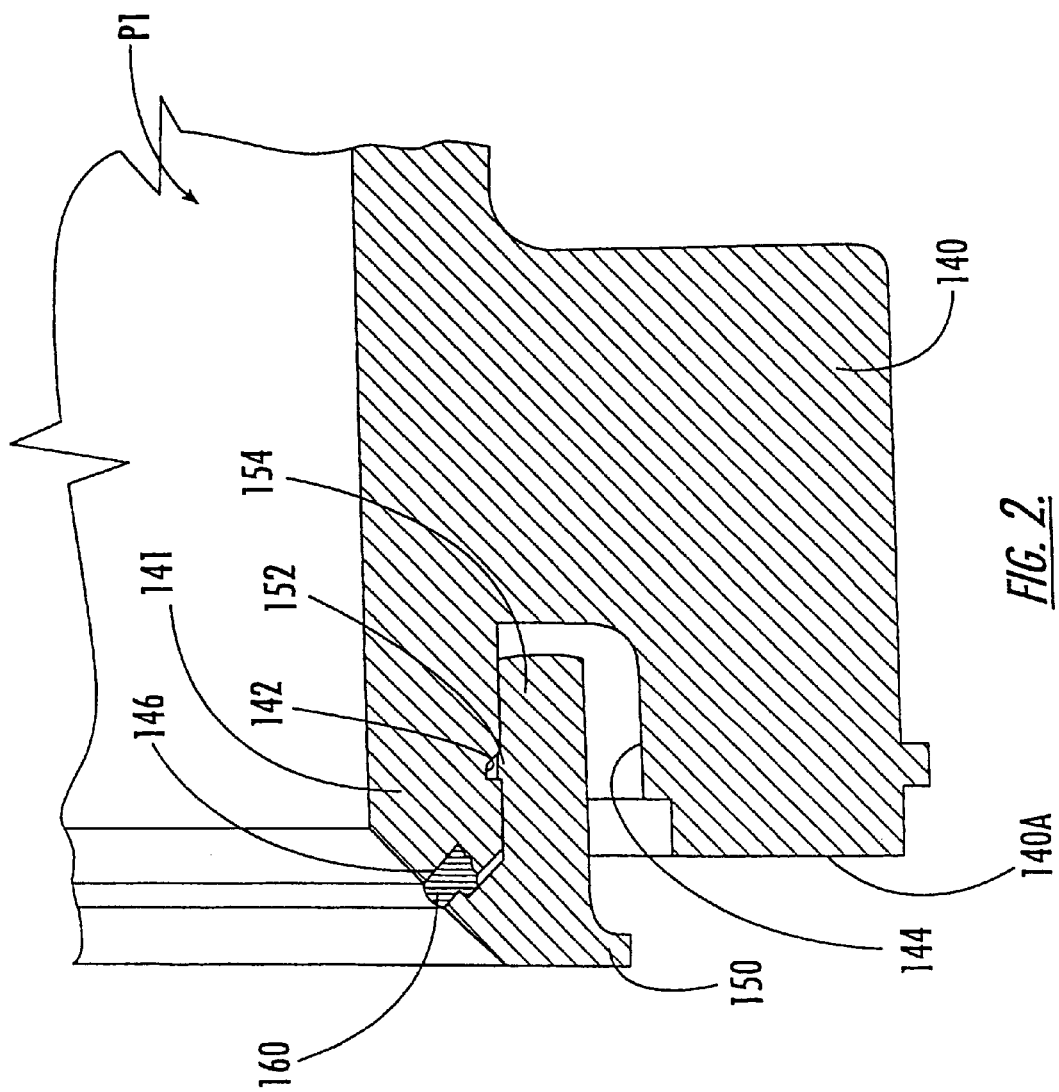
FIG. 2 is a center cross-sectional, fragmentary, enlarged view of a second body piece, a seat retainer and a seat of the valve assembly of FIG. 1.
Figure 6:
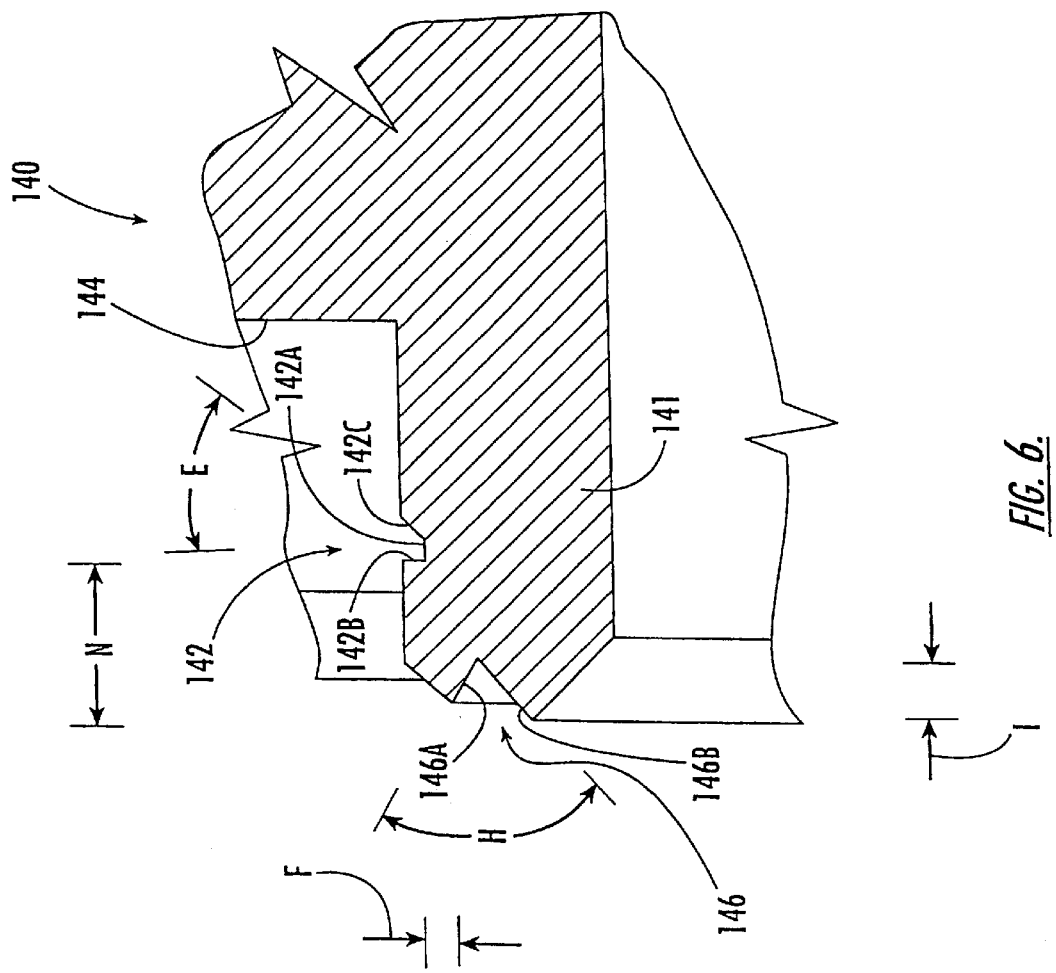
FIG. 6 is a center cross-sectional, fragmentary, enlarged view of the second body piece of the valve assembly of FIG. 1.
Figure 5:
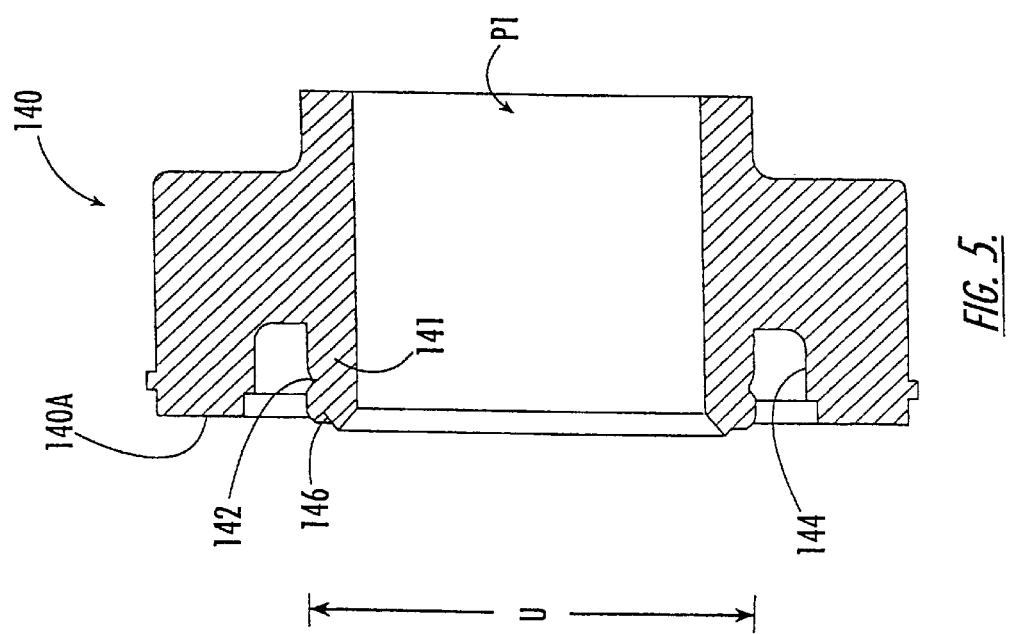
FIG. 5 is a center cross-sectional view of the second body piece of the valve assembly of FIG. 1 taken along the line 5—5 of FIG. 4.

FIG. 2 illustrates the relative arrangement of the second body piece 140, the seat 160 and the seat retainer 150 for retaining the seat 160 on the body piece 140. The base 154 surrounds the flange 141 and the projection 156 extends radially inwardly. The seat 160 is captured between the flange 141 and the projection 156 such that the portion 166 (see FIG. 12) is disposed in the groove 146, the projection 156 is received between the portions 163 and 167, and the portion 163 is exposed.

The projection 152 is received in the groove 142. The groove 142 and the projection 152 have complementary shapes and sizes so that the projection 152 is fully received in the groove 142. The reversed barb shapes of the projection 152 and the groove 142 cause the projection 152 and the groove 142 to resist removal of the seat retainer 150 by way of the seat retainer 150 sliding axially off of the flange 141.

From the foregoing description, it will be appreciated that the seat 160 is retained on the flange 141 and the seat retainer 150 such that the seat portion 163 is exposed and positioned to operatively engage the periphery of the ball 120. As will be better appreciated from the description below of the method for assembling the valve assembly 100, the seat retaining arrangement allows for improved convenience and consistency in the manufacture of the valve assembly.

The groove 142 is located a prescribed distance N (FIG. 6) from the front edge of the flange 141, preferably between about 0.12 and 2.0 inches. The prescribed spacing ensures a prescribed axial distance between the head 158 and the flange 141, and thereby a prescribed and desired pressure on the seat 160.

The radial depth F (FIG. 6) of the groove 142 is preferably between about 0.060 and 0.380 inch greater than the radial height J (FIG. 10) of the projection 152. The height J of the projection 152 is preferably between about 0.030 and 0.370 inch. The axial length K (FIG. 10) of the wall 152C is preferably between about 0.12 and 0.50 inch. The angle L (FIG. 10) of the wall 152B with respect to radial is preferably between about 10 and 80 degrees. The angle E (FIG. 6) of the wall 142C with respect to radial is preferably the same as the angle L. The axial depth I of the groove 146 and the angle H between the walls 146A and 146B are preferably complementary to the shape of the portion 167 of the seat 160. The projection 156 preferably has a length Q (FIG. 10) of between about 0.030 and 0.300 inch. The angle M of the wall 158A with respect to radial should be sized to provide clearance with the ball 120 in the assembled valve assembly 100.

The first body piece 130 is preferably formed in the same manner and from the same materials as discussed above for the second body piece 140. The arrangement for retaining the seat 160 on the first body piece 130 is essentially a mirror image of the arrangement for retaining the seat 160 on the second body piece 140 about a plane passing through the valve stem axis B—B and normal to the axis A—A. With reference to FIG. 7, the body piece 130 includes a flange 131, a groove 132, a groove 134 and an end groove 136 corresponding to the flange 141, the groove 142, the groove 144 and the groove 146, respectively, of the second body piece 140. The seat retainer 150 and the seat 160 mounted on the body piece 130 are preferably duplicates of the seat retainer 150 and the seat 160 mounted on the body piece 140. While the body piece 130 is not shown in perspective view, it will be readily appreciated that the shape of the body piece 130 is substantially the same as that of the body piece 140 (see, e.g., FIG. 3) with the further provision of the annular wall 139 extending forwardly.

According to a preferred method of the present invention, the valve assembly 100 may be assembled in the following manner. The seat 160 is mounted in the groove 136. The first resilient seat retainer 150 is then slid axially over the flange 131 until the projection 152 is received and snaps into the groove 132, thereby latching the seat retainer 150 onto the flange 141. In this manner, the projection 156 of the seat retainer 150 engages the seat 150 between the portions 163 and 167. The seat 160 is now securely retained on the flange 131 so that the body piece 130 may be handled and reoriented as desired. The continuous and radially oriented groove 132 ensures that the seat retainer 150 is positively located and uniform pressure is applied along the full perimeter of the seat 160, ultimately allowing a uniform seal with the ball 120.

The ball 120 is then inserted into the cavity C such that it engages the seat 160. The stem 110 or portions thereof also may be inserted into the cavity C, suitable methods for mounting the stem being known to those of ordinary skill in the art.

Prior to, concurrently with or following the insertion of the ball 120 into the cavity C, the seat 160 and the seat retainer 150 are mounted on the second body piece 140 in the same manner as described for mounting the seat 160 and the seat retainer 150 on the first body piece 130. Again, it will be appreciated that, because the seat 160 is now securely retained on the flange 141, the subassembly may be handled and reoriented as desired.

The subassembly including the body piece 140, the seat retainer 150 and the seat 160 is then mounted on the body piece 130 so as to encapsulate the ball 120 in the cavity C. Any suitable method for joining the body piece 140 to the body piece 130 may be employed. Preferably, the body piece 140 is secured to the body piece 130 by heating and fusing the faces 130A and 140A. Suitable equipment for fusing the body pieces includes a high velocity fusion machine such as the Model No. 824 available from McElroy Manufacturing, Inc of Tulsa, Okla. Alternatively, the body pieces 130, 140 may be joined by fastening, gluing or spin welding, for example.

The seat retaining arrangement secures, at least temporarily, the seats 160 on the body piece 130 and the body piece 140 so that the body pieces may be oriented as desired to facilitate other assembly steps. In particular, the seat retaining arrangement allows the body pieces to each be oriented and moved as needed to facilitate the body joining procedure (e.g., the fusing step). This convenience is provided without requiring relatively complex, unreliable, costly and/or precise machining or forming operations or special handling considerations. Moreover, the grooves 132, 142 and the projections 152 securely retain the seat even when the body pieces 130, 140, seat retainers 150 and/or seats 160 expand and contract due to changes in temperature.

While the arrangement described above is preferred, it is also contemplated that the locations of the projections 152 and the grooves 132, 142 may be reversed (not shown). Make particularly, the annular projections may be integrally formed or attached to the outer surfaces of the flanges 131, 141 and the complementary grooves may be formed in the inner surfaces of the seat retainers 150.

Similarly, while the grooves 132, 142 and projections 152 are preferably continuous and endless as described above, it is also contemplated that each projection 152 may be replaced with a plurality of spaced apart projections with circumferential gaps between adjacent projections. The projections would otherwise be formed as described above. If this configuration of projections is employed, the corresponding groove 132, 142 may be replaced with a plurality of spaced apart recesses with circumferential gaps between adjacent recesses. The recesses would otherwise be formed as described above.

The valve assembly 100 is also provided with an improved gearbox mounting arrangement. With reference to FIGS. 1 and 13–17, a gearbox 180 (see FIG. 1) is mounted on a mounting surface 135 of the body portion 139. The gearbox 180 may be any suitable gearbox. Suitable gearboxes include Model No. SQ-6 available from Dynatorque of Muskegon, Mich.. Conventionally, the gearbox 180 includes a motor 188, manual actuator or the like which selectively drives the stem 110 via a gear reducer 188A that engages an upper portion 114 of the stem 110. The gearbox 180 has a casing 182 including a bottom wall 182A. Such gearboxes are well known to those of ordinary skill in the art and, therefore, will not be described in farther detail herein.

Figure 14:
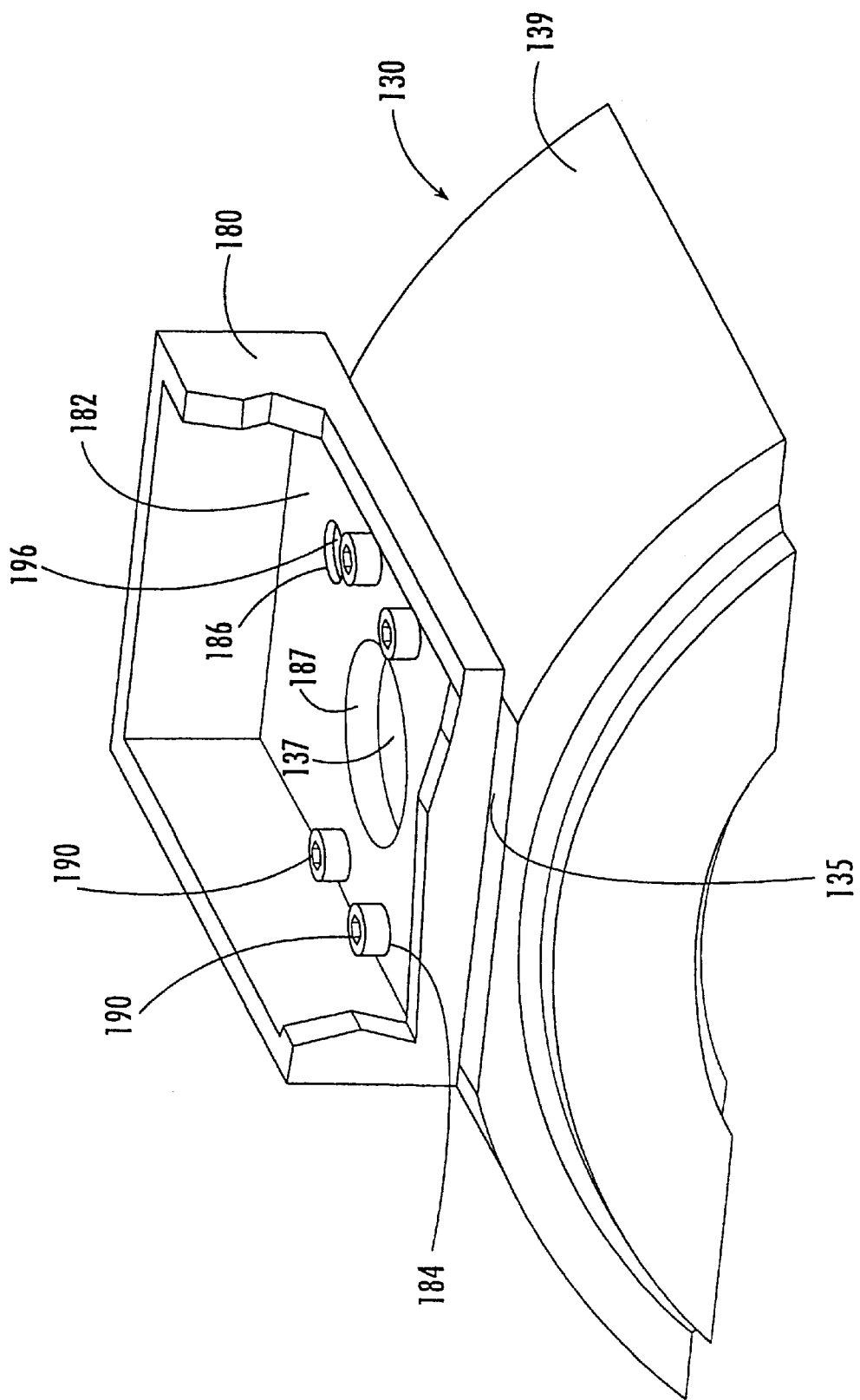
FIG. 14 is a perspective view of the valve assembly of FIG. 1 with the gearbox mounted thereon.

As shown in FIG. 14, the casing 182 (and, thereby, the gearbox 180) is positively secured to the body piece 130 by four threaded bolts 190. Additionally, a pair of rigid, upstanding pins 196 brace the gearbox 180 against reactive torque as drive force is applied to the stem 110.

With reference to FIG. 13, the bolts 190 are received through holes 184 in the bottom wall 182A and threadedly engage respective threaded bores 192. Preferably, and as shown, the holes 184 are countersunk to positively locate the bottom wall 182 with respect to the bolts 190, and thereby with respect to the mounting surface 135. A hole 187 is also formed in the bottom wall 182A and is positioned to overlie the hole 137 when the casing 182 is mounted on the body piece 130. The stem 110 (not shown in FIGS. 13 and 14) extends up through the holes 137, 187 and engages the gear reducer.

Preferably, each bore 192 includes an internally threaded nut 192A as shown in FIG. 16. Each nut 192A is formed of a material that is harder than the material of the body piece 130. Each nut 192A is bonded and/or adhered within a bore formed in the body piece 130 as shown. Preferably, each nut 192A is formed of metal. The nuts 192A provide a more secure engagement with the bolts 190. The nuts 192A also facilitate manufacture because threads need not be formed in the body piece 130. More or fewer bores 192 and bolts 190 may be provided; however, preferably at least four bores 192 and four bolts 190 are used.

The pins 196 are preferably formed of metal and, more preferably, of stainless steel. The pins 196 are embedded in the body piece 130 as shown in FIG. 17. The polymeric material of the body piece 130 is bonded and/or adhered to the pins 196. If bonded, the pins 196 are preferably bonded in place during the molding of the valve body piece 130. If adhered, preferably a structural acrylic adhesive is used. The pins 196 are received in respective holes 186 formed in the bottom wall 182A. More or fewer pins 196 may be provided; however, preferably at least two pins 196 are used.

Preferably, the pins 196 each have a length P extending above the mounting surface 135 (see FIG. 17) of at least 0.12 inch, and more preferably of between about 0.12 inch and 0.75 inch. Preferably, the pins 196 each have a length Y embedded in the body piece 130 which is between about one and one and a half times the diameter of the pin 196. The centers of the pins 196 are equidistant from the axis of stem rotation and are on diametrically opposite sides thereof. Preferably, the pins 196 are each spaced between about 1 and 6 inches from the center of the hole 137, depending on the anticipated torque loads.

When the gearbox 180 is mounted on the mounting surface 135, the bolts serve to positively position and secure the gearbox 180 on the body piece 130. In this way, the mounting arrangement ensures that the gearbox 180 is properly aligned with the stem 110 and other components of the valve assembly 100. The pins 196 serve to resist reactive forces from the motor as the gearbox attempts to turn the ball 120. In this manner, stresses on the bolts 190 and the nuts 192A are reduced or eliminated.

Alternatively, the pins 196 may be affixed to the bottom wall 182A of the casing 182 and received in mating bores in the mounting surface 135. Preferably, in this configuration, the pins are press fitted into the mating bores in the body to provide a tight fit and to accommodate relaxation of the polymeric body material. However, this alternative configuration may not be as convenient to assemble and may not provide as tight a fit as the gearbox mounting arrangement described above.

Also alternatively, the threaded bores 192 may be replaced with externally threaded, upstanding studs partially embedded in the valve body. The studs extend up through the holes 184 and the gearbox is secured in place by internally threaded nuts. However, due to the tendency of the polymeric valve body material (especially polyethylene) to relax under load, this alternative gearbox mounting arrangement may not provide as rigid and durable of a mount as the gearbox mounting arrangement first described above.

It will be appreciated that the valve assembly may include other gearbox mounting arrangements or may not use a gearbox. It will also be appreciated that the gearbox arrangement described herein may be used with valve assemblies of other designs.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A valve assembly comprising:
    a) a valve including:
        a valve body having a drive opening and a mounting surface adjacent said drive opening;
        at least one mounting bore formed in said mounting surface;
        at least one rigid pin fixed to and projecting from said mounting surface; and
        a rotatable valve member disposed in said valve body;
    b) a gearbox operable to rotate said valve member through said drive opening, said gearbox including:
        a casing including:
            a mounting wall positioned adjacent said mounting surface of said valve body;
            at least one mounting hole formed in said mounting wall and disposed adjacent said mounting bore;
            at least one pin hole formed in said mounting wall and receiving said pin;
            a drive hole formed in said mounting wall and communicating with said drive opening;
    c) at least one fastener extending through said mounting hole and engaging said mounting bore to secure said casing to said mounting surface;
    d) wherein said pin resists relative rotational movement of said casing and said valve body.

2. The valve assembly of claim 1 including:
    at least two of said mounting bores formed in said mounting surface;
    at least two of said mounting holes formed in said mounting wall; and
    at least two of said fasteners, each of said fasteners extending through a respective one of said mounting holes and engaging a respective one of said mounting bores to secure said casing to said mounting surface.

3. The valve assembly of claim 1 including a metal, internally threaded nut disposed in said mounting bore.

4. The valve assembly of claim 1 including:
    at least two of said rigid pins projecting from said mounting surface; and
    at least two of said pin holes formed in said mounting wall, each of said pins engaging a respective one of said pin holes.

5. The valve assembly of claim 1 wherein said pin is formed of metal.

6. The valve assembly of claim 1 wherein said valve body is formed of a polymeric material.

7. The valve assembly of claim 1 including a valve stem extending through said drive opening, said valve stem having a first end engaging said valve member and a second, opposed end engaging said gearbox.

8. The valve assembly of claim 1 wherein said gearbox further includes drive means.

9. A valve assembly comprising:
    a) a valve including:
        a valve body having a drive opening and a mounting surface adjacent said drive opening, said valve body being formed of a polymeric material;
        a plurality of mounting bores formed in said mounting surface;
        a plurality of metal, internally threaded nuts, each of said nuts being disposed in a respective one of said mounting bores;
        a plurality of rigid pins fixed to and projecting from said mounting surface; and
        a rotatable valve member disposed in said valve body;
    b) a gearbox operable to rotate said valve member through said drive opening, said gearbox including:
        a casing including:
            a mounting wall positioned adjacent said mounting surface of said valve body;
            a plurality of mounting holes formed in said mounting wall, each of said mounting holes being disposed adjacent a respective one of said mounting bores;
            a plurality of pin holes formed in said mounting wall, each of said pin holes receiving a respective one of said pins;
            a drive hole formed in said mounting wall and communicating with said drive opening;
    c) a plurality of fasteners, each of said fasteners extending through a respective one of said mounting holes and engaging a respective one of said mounting bores to secure said casing to said mounting surface;

d) wherein said pins resist relative rotational movement of said casing and said valve body.

10. The valve assembly of claim 9 wherein said pin is formed of metal.

11. The valve assembly of claim 9 including a valve stem extending through said drive opening, said valve stem having a first end engaging said valve member and a second, opposed end engaging said gearbox.

12. The valve assembly of claim 9 wherein said gearbox further includes drive means.

13. A method for mounting a gearbox on a valve having a valve body and a rotable valve member disposed in the valve body, said method comprising the steps of:

placing the gearbox on a mounting surface of the valve body such that a drive hole formed in a mounting wall of the gearbox communicates with a drive opening in the valve body and such that at least one rigid pin fixed to and projecting from the mounting surface is received in at least one corresponding pin hole in the mounting wall of the gearbox; and inserting fasteners through at least one mounting hole in the mounting wall such that the fastener engages a bore formed in the valve body to secure the gearbox to the mounting surface.

14. The method of claim 13 wherein said step of placing the gearbox includes placing the gearbox on the mounting surface such that a plurality of the rigid pins fixed to and projecting from the mounting surface are each received in a respective one of a plurality of the pin holes in the mounting wall of the gearbox.

15. The method of claim 13 wherein said step inserting fasteners includes inserting each of a plurality of the fasteners through a respective one of a plurality of the mounting holes such that each of the fasteners engages a respective one of a plurality of the bores to secure the gearbox to the mounting surface.

16. A valve assembly comprising:

a) a valve including:
   a valve body having a drive opening and a mounting surface adjacent said drive opening; and
   a rotatable valve member disposed in said valve body;

b) a gearbox operable to rotate said valve member through said drive opening, said gearbox including:
   a casing including:
      a mounting wall positioned adjacent said mounting surface of said valve body;
      at least one mounting hole formed in said mounting wall; and
      a drive hole formed in said mounting wall and communicating with said drive opening;

c) at least one rigid pin fixed to and projecting from one of said mounting surface and said bottom wall and being received in the other of said mounting surface and said bottom wall; and d) at least one fastener extending through said mounting hole to secure said casing to said mounting surface;

e) wherein said pin resists relative rotational movement of said casing and said valve body.

* * * * *